United States Patent [19]

Curtin

[11] Patent Number: 5,058,991

[45] Date of Patent: Oct. 22, 1991

[54] MAILABLE 3-D VIEWERS OF POST CARD SIZE

[76] Inventor: James J. Curtin, 3300 Cove Cay, #7E, Clearwater, Fla. 34620

[21] Appl. No.: 602,534

[22] Filed: Oct. 24, 1990

Related U.S. Application Data

[63] Continuation-in-part of Ser. No. 334,957, Apr. 10, 1989, abandoned.

[51] Int. Cl.$^5$ .................... G02B 27/22; G02B 27/04
[52] U.S. Cl. .................................................. 359/474
[58] Field of Search ............................... 350/140, 546

[56] References Cited

U.S. PATENT DOCUMENTS

| | | | |
|---|---|---|---|
| 991,948 | 5/1911 | Carley | 350/140 |
| 1,281,746 | 10/1918 | Allen et al. | 350/140 |
| 2,368,480 | 1/1925 | McClure | 350/140 |
| 2,621,562 | 12/1952 | Stone | 350/140 |

FOREIGN PATENT DOCUMENTS 487598  9/1913  France ................. 350/140

Primary Examiner—Jon W. Henry
Attorney, Agent, or Firm—Jospeh C. Mason, Jr.; Ronald E. Smith

[57] ABSTRACT

A 3-D viewer is created by folding paper such as card stock in a predetermined manner. A first section of the viewer carries a pair of 3-D lenses and a second section, which is held normal to the plane of the first section when the viewer is in use, has a longitudinal extent substantially equal to the focal length of the lenses. In a first embodiment, a third section is foldably connected to the second section, carries a pair of 3-D scenes, and is held generally parallel to the first section when the scenes are viewed. Only one scene is provided in a second embodiment. Third and fourth embodiments add a fourth section that interconnects the free ends of the first and third sections of the first and second embodiments, respectively. That fourth section suggests to the user that the sections should be held in a square, box-like configuration. In the fourth embodiment, a foldable flap locks the viewer into the box-like configuration and serves as a septum member that facilitates viewing of the 3-D images. in a fifth embodiment, the flap is independently formed.

2 Claims, 10 Drawing Sheets

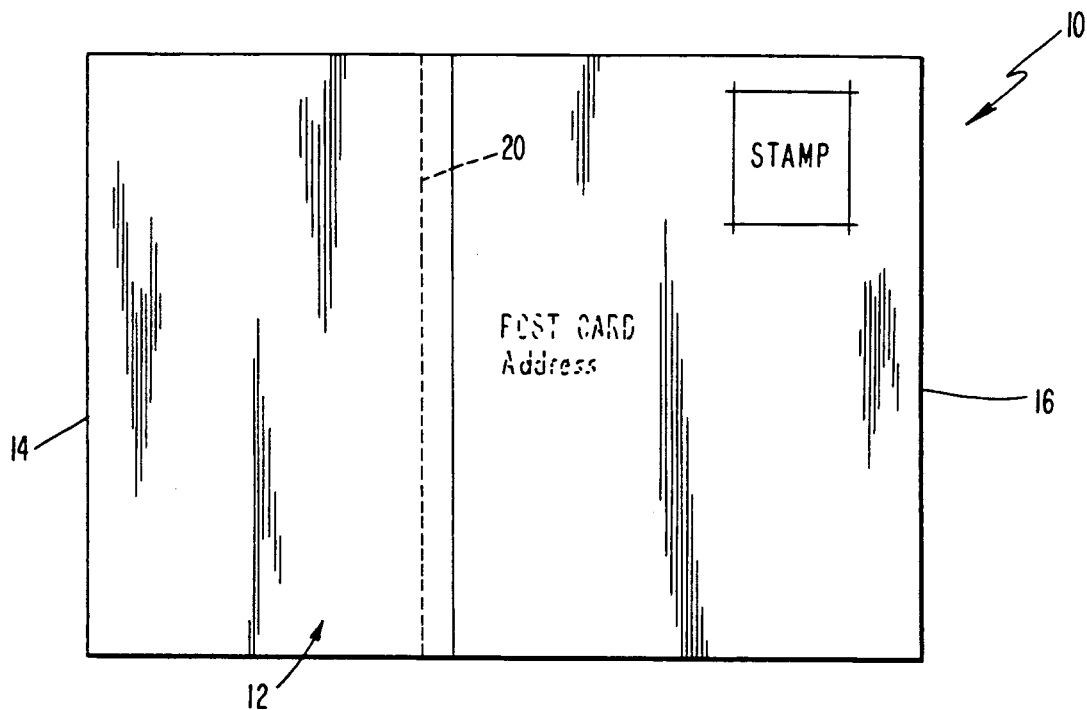
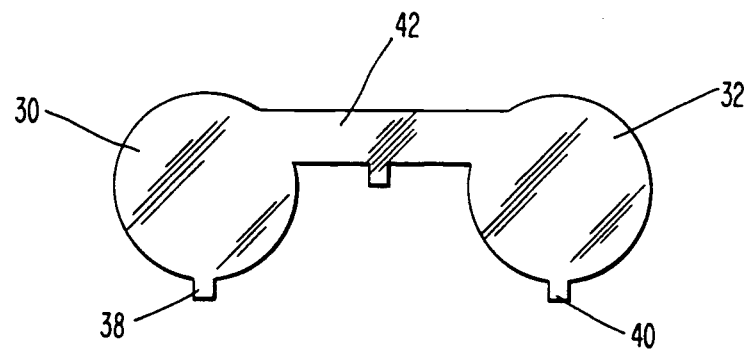

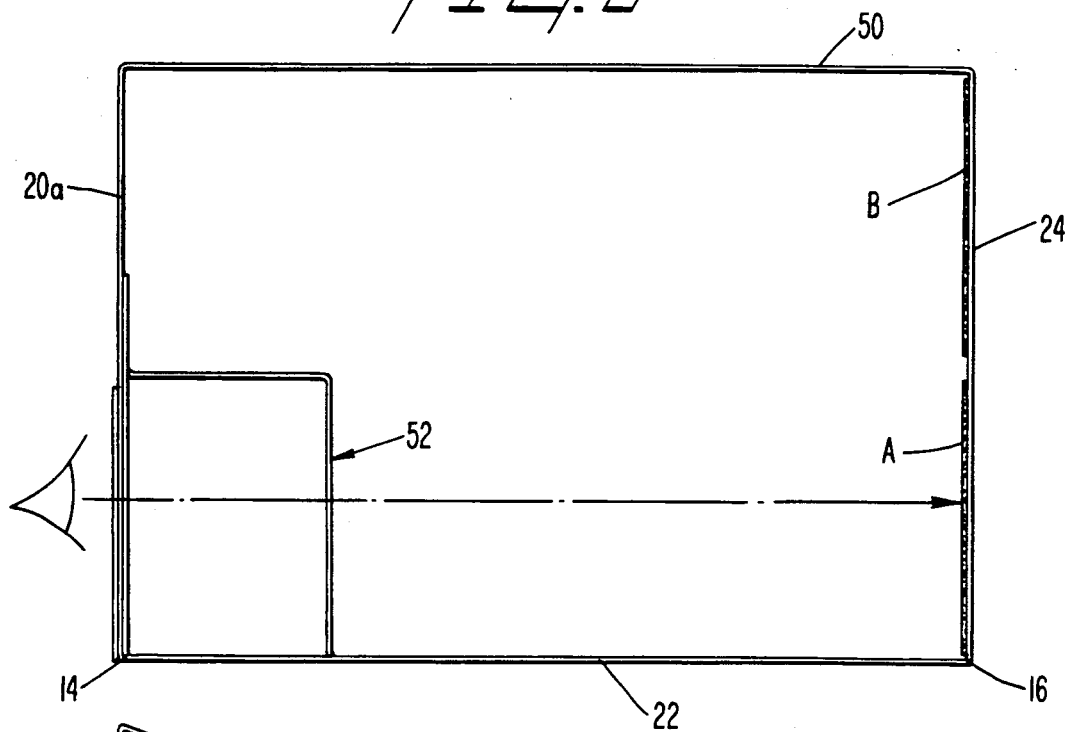
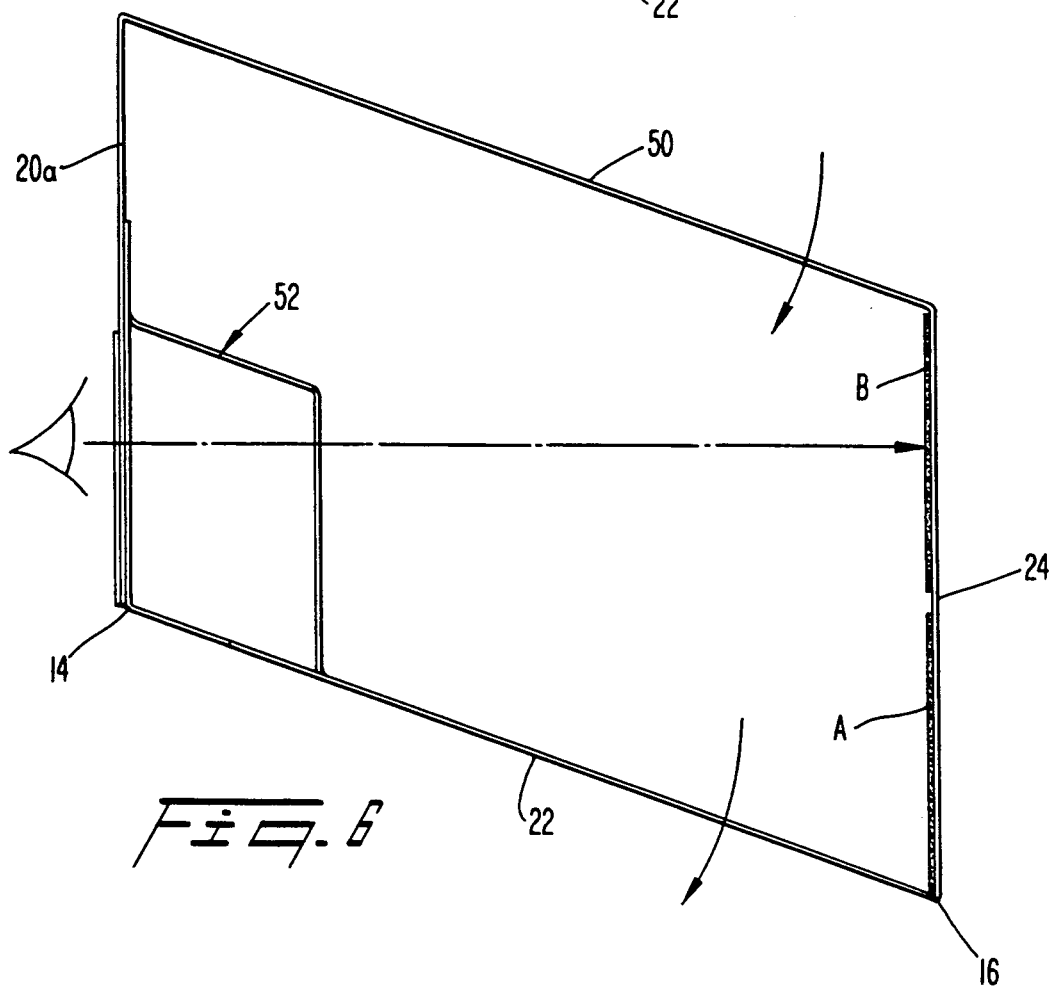

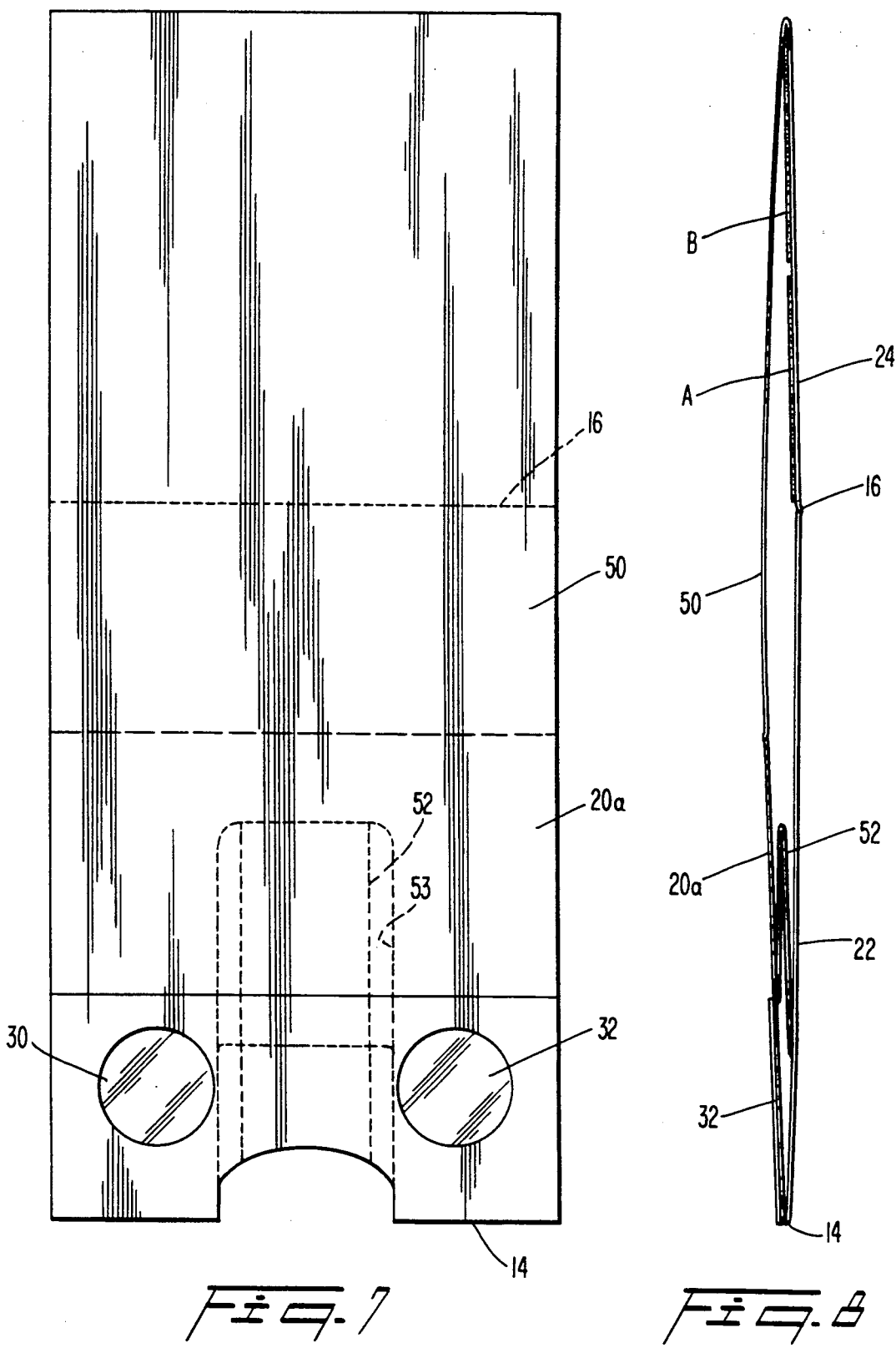

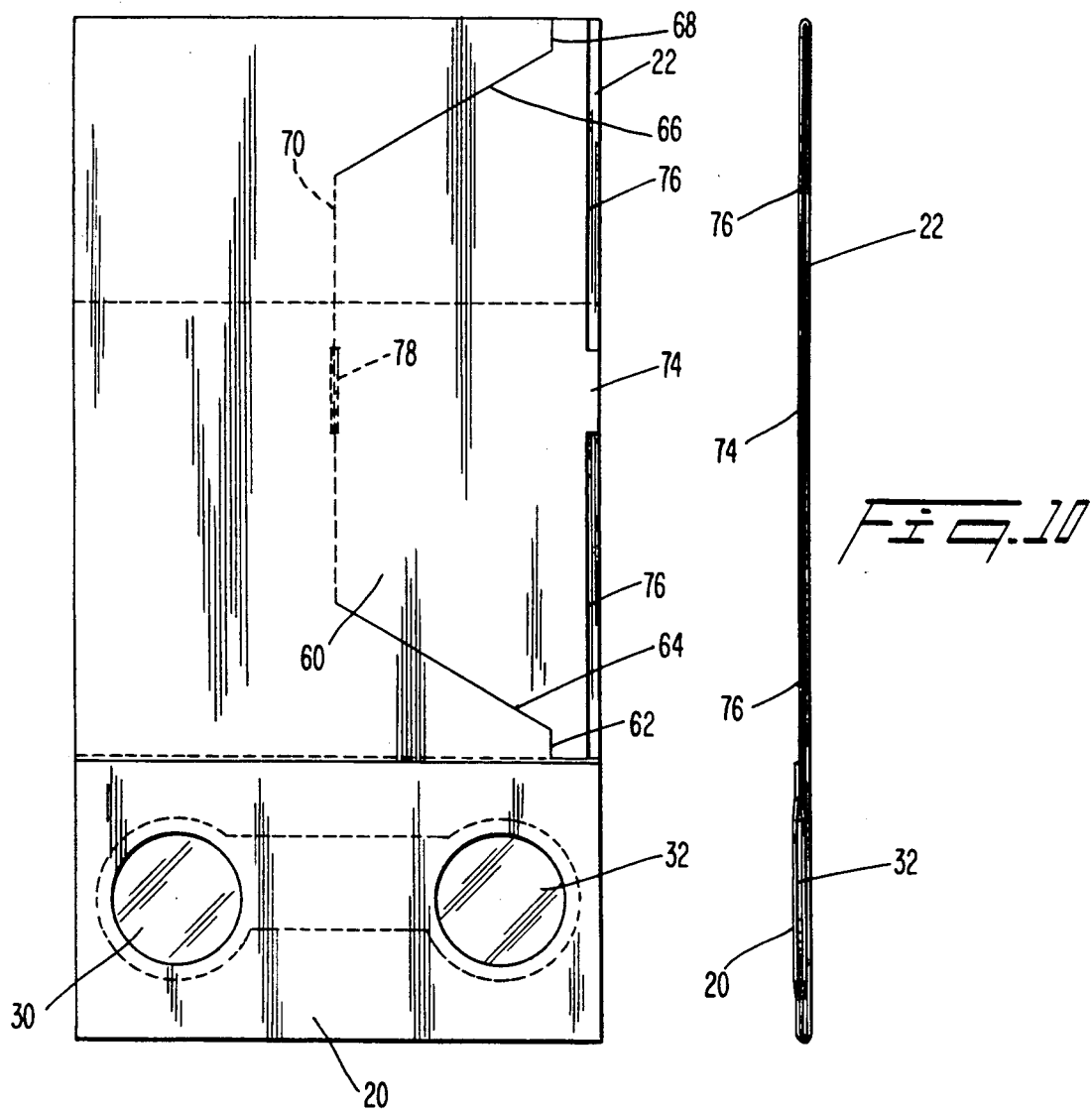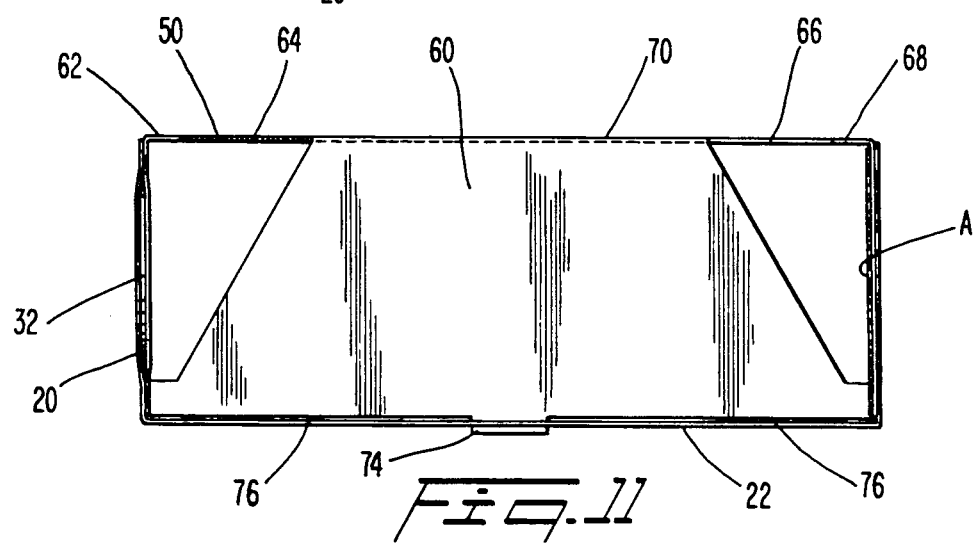

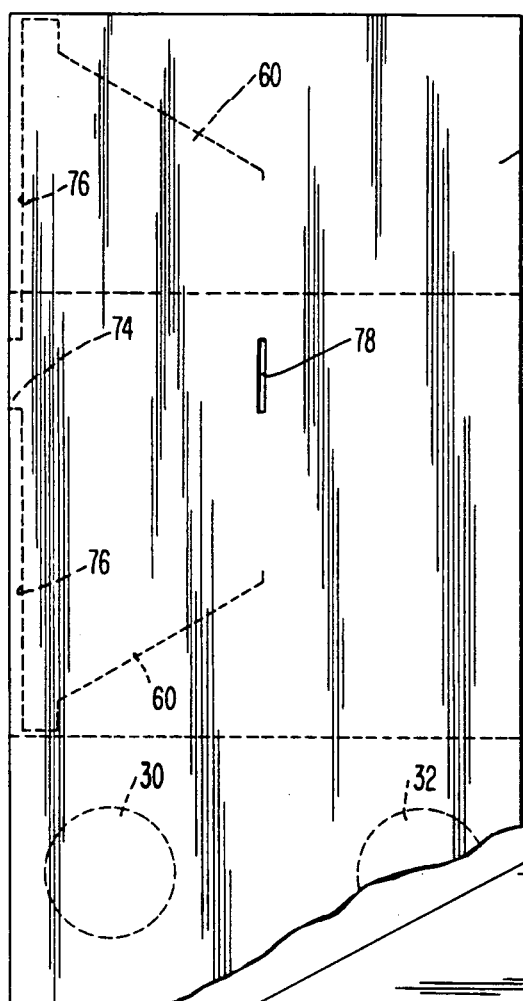
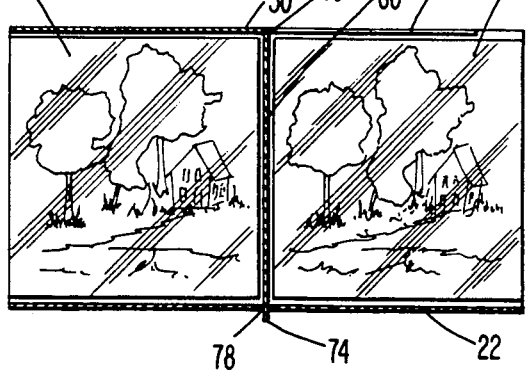
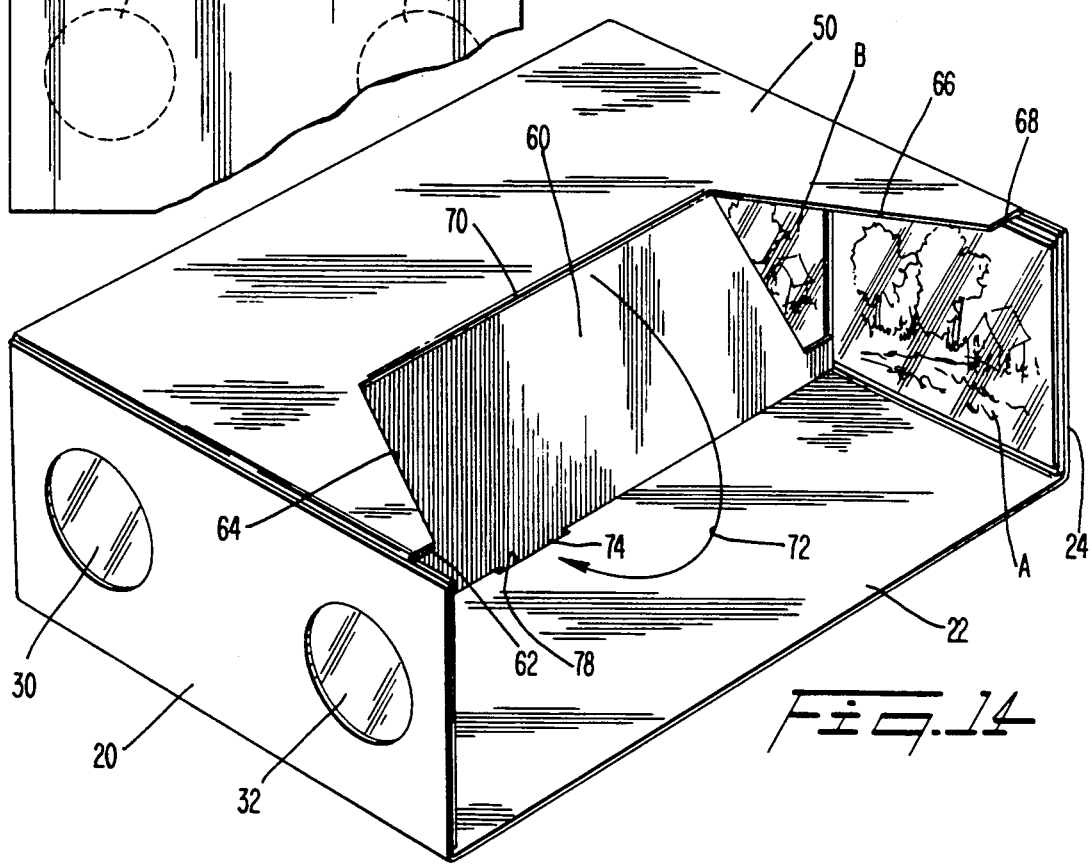

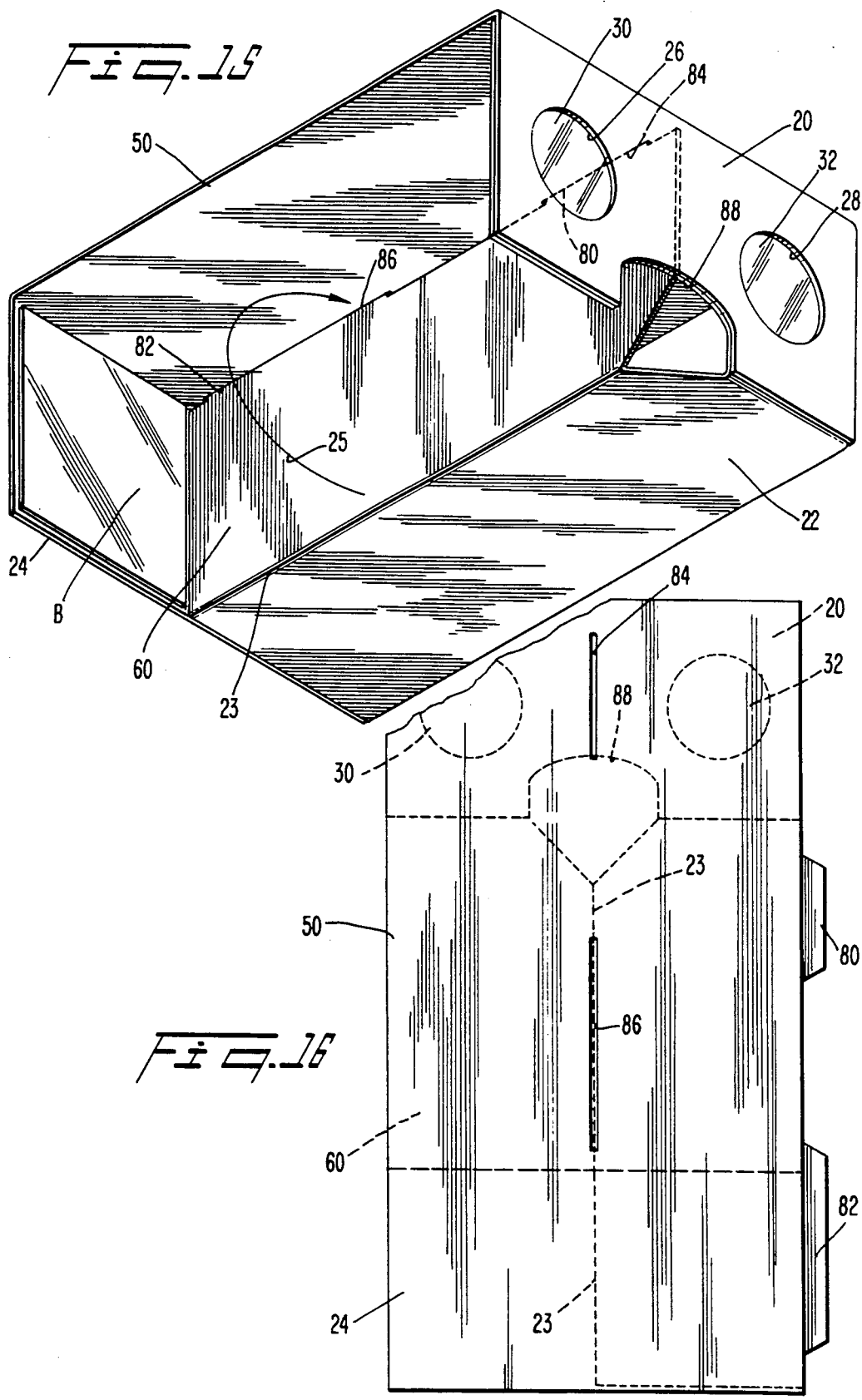

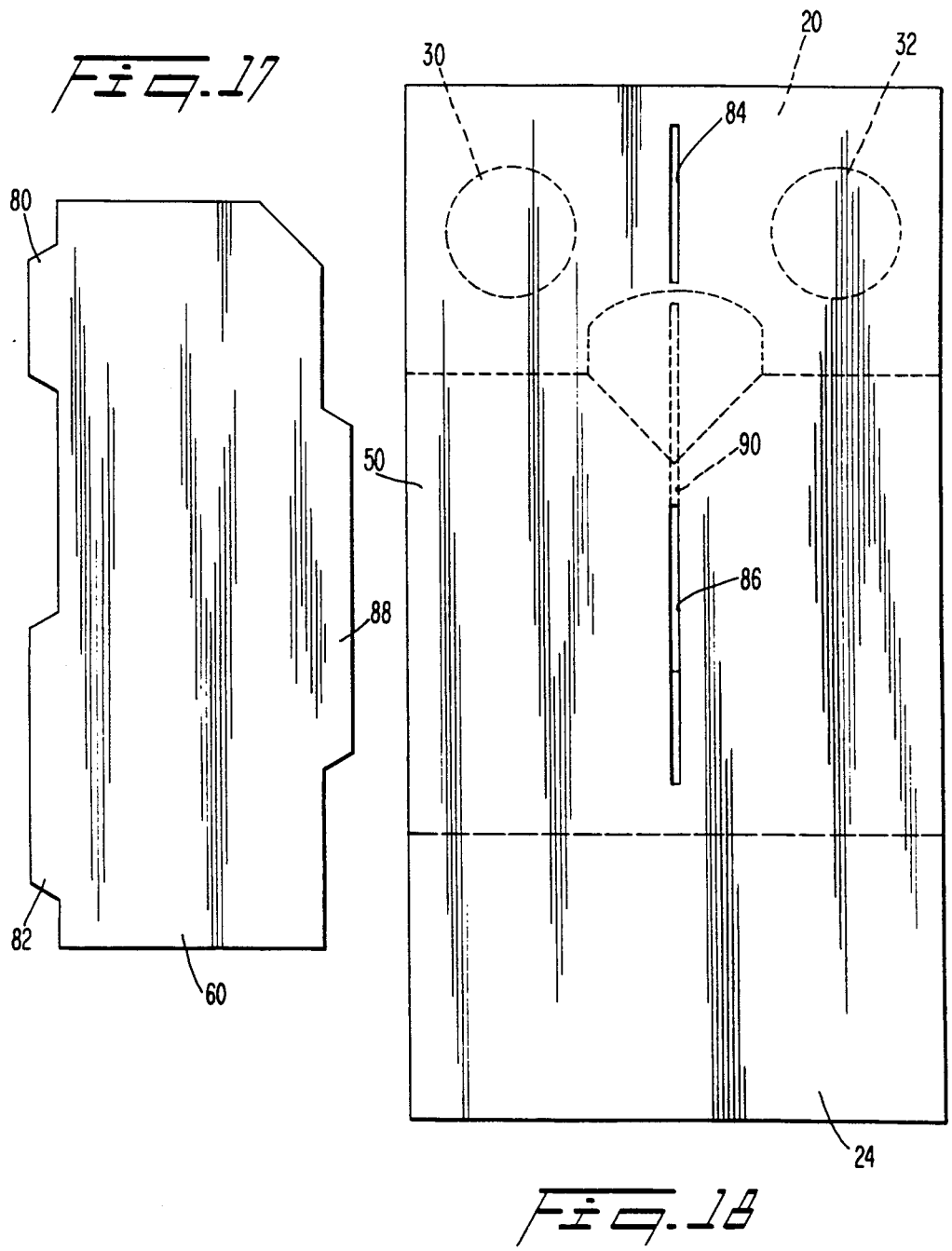

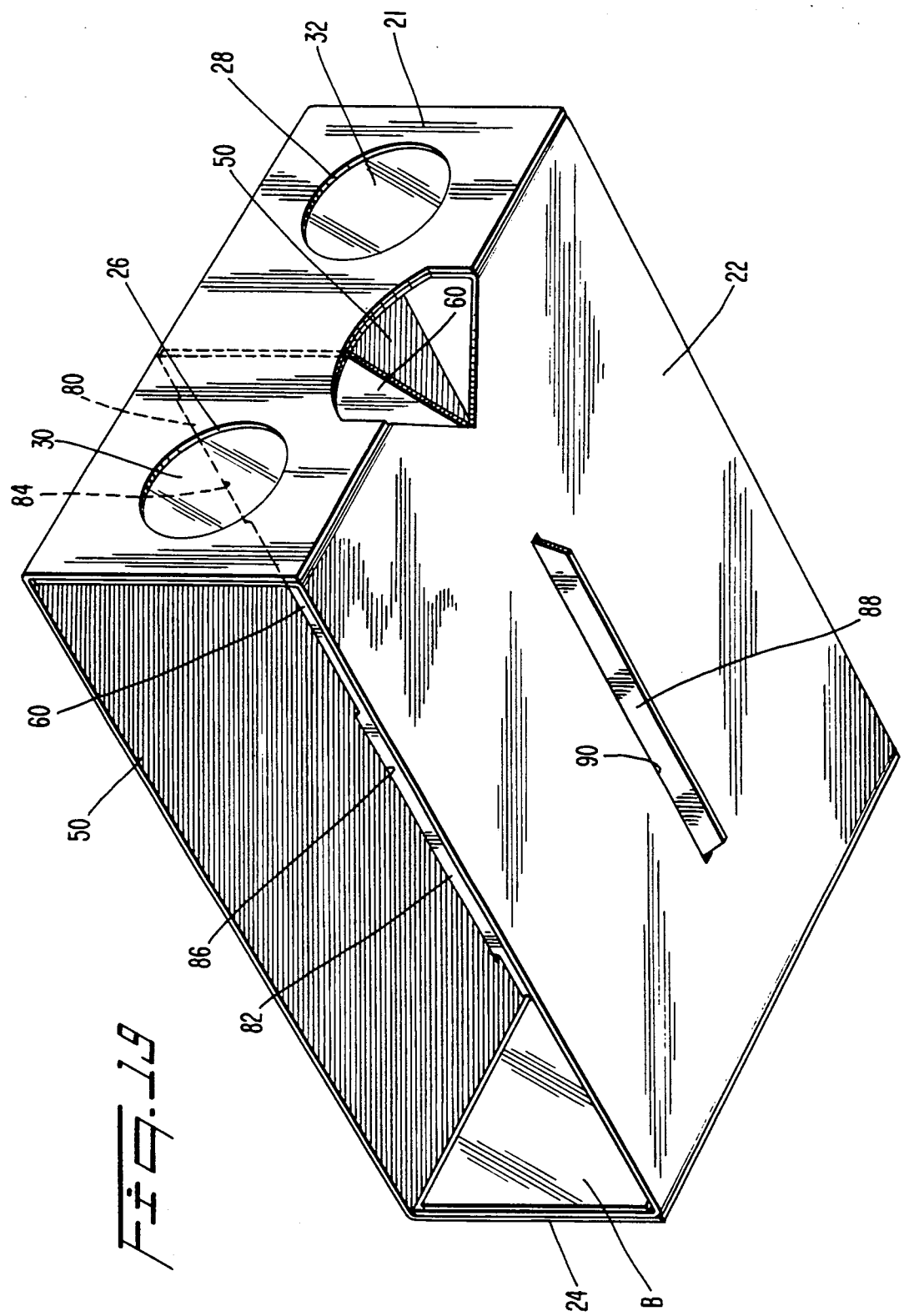

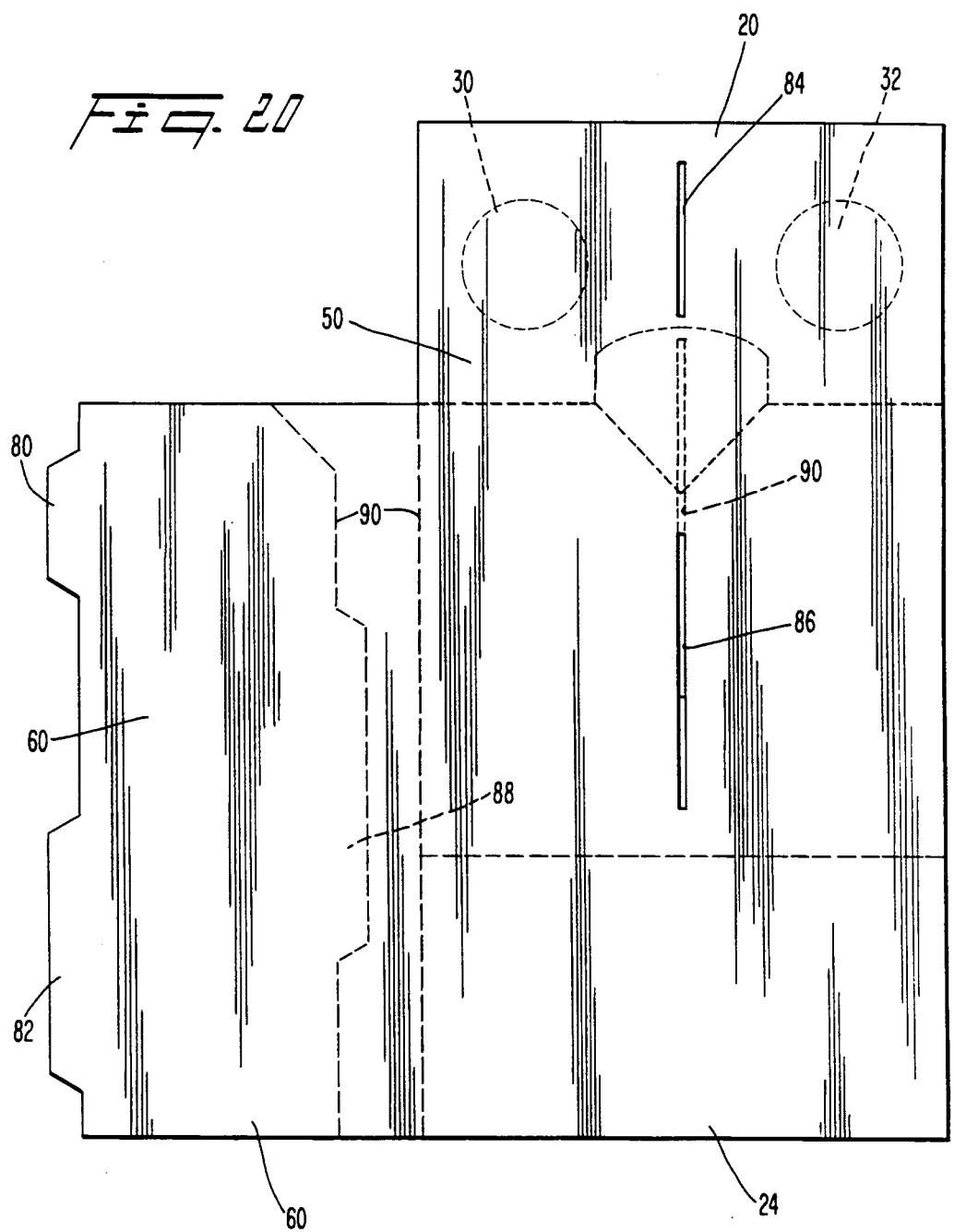

MAILABLE 3-D VIEWERS OF POST CARD SIZE

CROSS-REFERENCE TO RELATED APPLICATIONS

This disclosure is a continuation-in-part of a copending disclosure by the same inventor, entitled "3-D Viewers Made from Sheet Materials" Ser. No. 334,957, filed Apr. 10, 1986, and now abandoned.

TECHNICAL FIELD

This invention relates, generally, to 3-D viewers made of foldable materials. More particularly, it relates to a viewer having utility as a mailable postcard.

BACKGROUND ART

A 1942 U.S. Pat. No. to Wendling (2,283,777) shows a greeting card having flaps at its opposite ends. One of the flaps carries a 3-D scene and the other flap carries stereoscopic windows.

U.S. Pat. Nos. 2,757,573 to Turner and 4,660,931 to Chevalier disclose viewers for stereoscopic pictures in the form of foldable viewers that may be mailed in flat, relatively compact packages and then opened for viewing. U.S. Pat. No. 4,558,528 to Cunningham discloses a 3-D viewer having a series of scenes. Other patents in the field of this invention that may be of interest to invention historians include U.S. Pat. Nos. 2,986,830, 2,984,153, 906,774, 2,715,853 and 2,696,754. Foreign patents of interest include French 340,661 and European 275.

U.S. Pat. Nos. to Tinker (2,616,333), Dennis (2,334,483) and Bierstadt (174,893) also show stereoscopic devices having some structural similarities to the invention disclosed hereinafter.

DISCLOSURE OF INVENTION

The present invention has the width and length of a standard U.S. Postal Service postcard when folded, and its thickness meets the standard for items mailed as postcards.

In a first embodiment, a scene-carrying panel or section of the sheet material from which the invention is made is the size of a postcard; four images are positioned thereon. Two slightly different pictures of the same scene are placed in closely spaced, lateral relation to one another on a top row, and two slightly different pictures of a different scene are placed in closely spaced, lateral relation to one another on a bottom row. The scene-carrying panel is folded into a position where it is substantially perpendicular to an intermediate panel or section of the device of the same size. Still another panel of the device, positioned at the opposite end of the intermediate panel, is folded into a position where it is substantially perpendicular to said intermediate panel, i.e., said panel is placed into substantially parallel alignment with the scene-carrying panel. 3-D lenses are carried and locked into position by said panel. Accordingly, either scene carried by the scene-carrying panel is easily viewed. Advantageously, the 3-D scenes carried by the scene-carrying panel may include tourist attraction scenes photographed in the area where the device is available for sale.

In a second embodiment, the scene-carrying panel carries two images only to provide a single scene.

In third and fourth embodiments, a fourth panel interconnects the lens-carrying and scene-carrying panels of the viewer to provide a box-like structure when the viewer is operatively employed. The fourth embodiment further includes a foldable flap member that performs the dual function of holding the viewer open and of providing a septum means to facilitate viewing of the 3-D scene or scenes.

In another embodiment, the flap is individually formed but performs the same function as the foldable flap when operatively installed.

A general object of this invention is to promote the art of 3-D photography by opening up new ways to present such photography to the public.

Another object of this invention is to provide a postcard that contains at least one 3-D image.

Another object to advance the art of advertising by opening up new ways to advertise goods and services.

Still another important object is to advance the art of stereoscopic viewers by providing the same in simple folding carton form.

The invention accordingly comprises the features of construction, combination of elements and arrangement of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a front elevational view of a first embodiment of the invention when in its folded, mailable configuration;

FIG. 3 is a plan view of the lenses of this invention;

FIG. 5 is a side elevational view of the third embodiment in its operative configuration;

FIG. 6 is a view similar to FIG. 5, showing how a misalignment of the novel viewer does not greatly adversely affect its utility;

FIG. 7 is a top plan view of the embodiment of FIGS. 5 and 6 when in its knocked down flat configuration;

FIG. 8 is a side elevational view of the viewer when in its FIG. 7 configuration;

FIG. 9 is a top plan view of a fourth embodiment of the invention when in its knocked down flat configuration;

FIG. 10 is a side elevational view of the fourth embodiment when in its FIG. 9 configuration;

FIG. 11 is a side elevational view of the fourth embodiment of the viewer when in its unfolded, operative configuration;

FIG. 12 is a bottom plan view of the viewer when in its knocked down flat configuration;

FIG. 13 is a front elevational view of a pair of 3-D scenes that produce a 3-D dimensional image when viewed with the novel viewer;

FIG. 14 is a perspective view of the fourth embodiment of the viewer;

FIG. 15 is a perspective view of a fifth embodiment as viewed from the bottom;

FIG. 16 is a top plan view of the embodiment of FIG. 15 when in its knocked down flat configuration;

FIG. 17 is a side elevational view of a novel septum means;

FIG. 18 is a top plan view of an embodiment of the invention with which the septum means of FIG. 17 is used, said embodiment being shown in its knocked down flat configuration;

FIG. 19 is a perspective view, from the bottom, of the embodiment of FIG. 18 when in its unfolded, operative configuration and with the septum means of FIG. 17 operatively positioned therein; and FIG. 20 is a top plan view of a similar embodiment in its knocked down flat configuration, showing the septum means attached to the viewer along perforation lines.

Similar reference numerals refer to similar parts throughout the several views of the drawings.

BEST MODES FOR CARRYING OUT THE INVENTION

Figure 2:
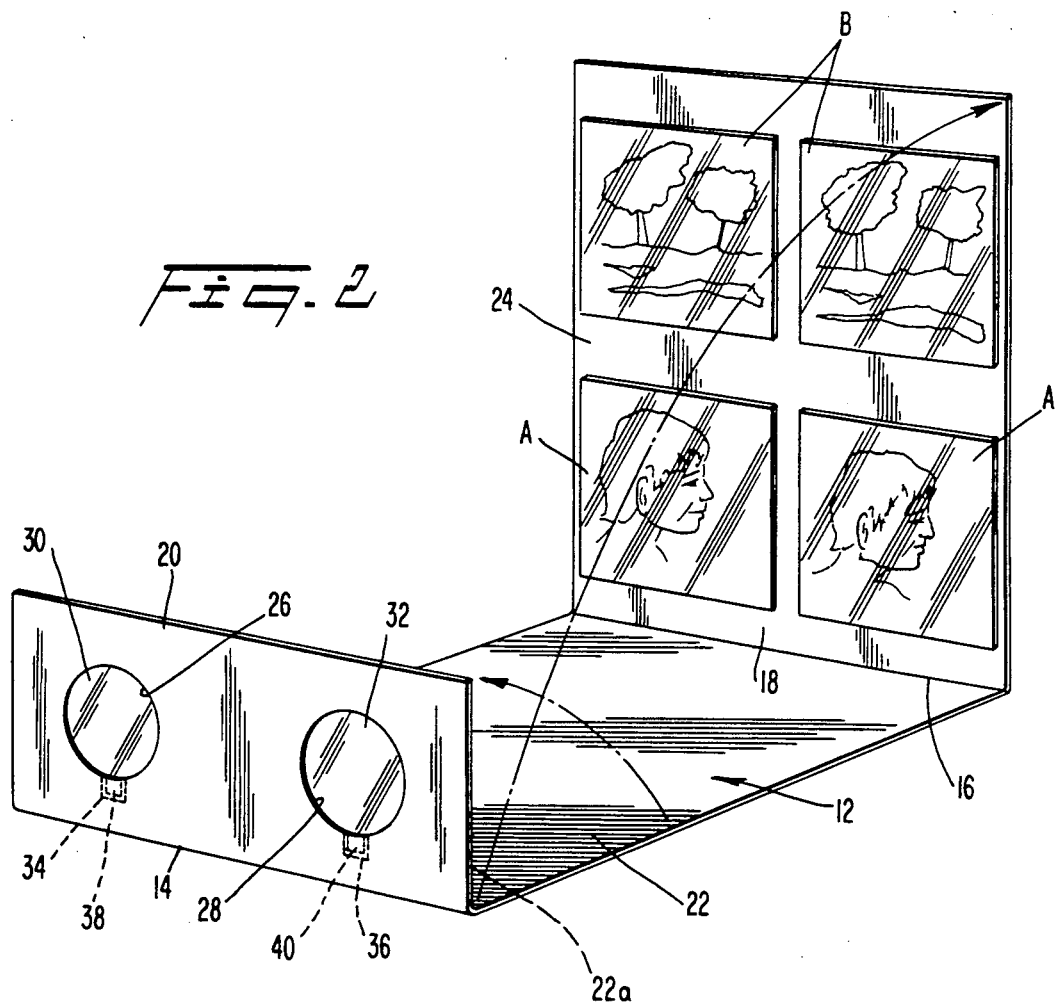
FIG. 2 is a perspective view of a first embodiment of the invention in its unfolded, operative configuration.

Referring now to FIG. 1, it will there be seen that an illustrative embodiment of the invention is denoted as a whole by the reference numeral 10.

Stereoscopic viewer 10 is formed of a flat sheet material such as card stock 12 or other suitable material. As shown in FIG. 1, viewer 10 has the appearance and functions as a mailable post card when in its folded configuration. It may also be provided in the form of a greeting card or other type of card.

Card stock 12, in this first embodiment, has two folding lines as perhaps best shown in FIG. 2: the first folding line 14 and second folding line 16. The folding lines are substantially parallel to one another and are disposed transverse to the longitudinal axis of symmetry 18 of card stock 12. They partition card stock 12 into three panels or sections: first section 20, second section 22 and third section 24.

Two apertures 26, 28 are formed in section 20, and each aperture receives an associated 3-D lens 30,32. Although each lens may be locked into position by any number of suitable means, a suitable locking means includes a key way 34,36 formed in open communication with each aperture 26,28. A corresponding key in the form of integral projections 38,40 formed on lenses 30,32 respectively, fits into its associated key way and locks each lens into its operative configuration.

The lenses are shown separately in FIG. 3; there it will be seen that they are held in fixed spaced relation to one another by rigid interconnecting member 42.

The lenses are specially manufactured transparent 3-D lenses which form no part of the invention, per se.

As shown in FIG. 2, a first pair of 3-D images, each of which is denoted A, are mounted in closely spaced lateral relation to one another on opposite sides of the device's longitudinal axis of symmetry 18. To view the 3-D scene provided by photographs A,A, section 22 is held in a generally horizontal plane, and section 20 is held in upstanding relation thereto, i.e., in a generally vertical plane, as is section 24. Thus, sections 20 and 24 are placed into substantially parallel alignment with one another. A 3-D scene then appears when one inspects images A,A through lenses 30,32. The angular orientation of any of the three sections 20,22,24 can be varied at the pleasure of the viewer.

A second set of images, each denoted by the reference letter B, are similarly mounted on section 24, upwardly of the photographs A,A as shown. In this manner, two entirely different 3-D scenes are provided in a single postcard. The photographs A,A and B,B are not out of focus when viewed with the unaided eye; thus, as aforesaid, lenses 30,32 are transparent, i.e., they are not the colored lenses of the type employed when observing out-of-focus 3-D scenes.

The power of the lenses is selected so that the longitudinal extent of intermediate section 22 is substantially equal to the focal length of the lenses, i.e., the images on scene-carrying section 24 are in clear focus when the viewer 10 is used in the manner above described.

The reverse side 22a of panel 22 has imprinted thereon the markings of the addressable part of a postcard, and includes a designated area in the upper right hand corner thereof for a postage stamp as shown in FIG. 1.

The reverse side 24a of panel 24 is the message-carrying part of viewer 10. Thus, when section 20 is folded along fold line 14 so that it overlies section 22, and section 24 is subsequently folded along fold line 16 so that it overlies sections 20 and 22, the reverse sides 22a and 24a of panels 22 and 24, respectively, form a mailer having the general appearance of a postcard. A suitable sealing means is used to maintain the mailer in its closed configuration. Thus, the addressee, upon unfolding the mailer, is treated to at least two 3-D scenes of the locale from which the postcard originated. The embodiment shown in FIGS. 1-3 has been approved for mailing by the U.S. Postal Service.

Figure 4:
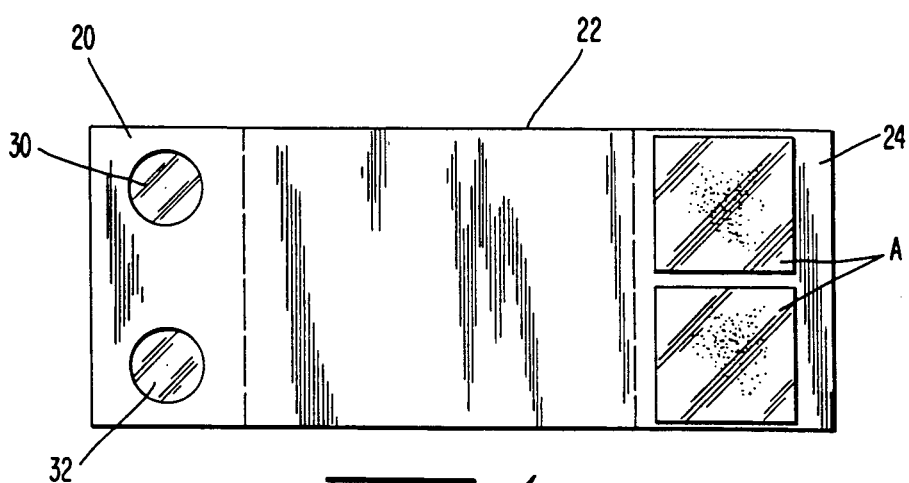
FIG. 4 is a plan view of a second embodiment of the invention in its unfolded, flat configuration.

A second embodiment of the invention is depicted in FIG. 4; in this 3-D scene is provided instead of the two as in the first-described embodiment. Each scene is generated by two photographs, each denoted by the letter A. Thus, this second embodiment has less utility as a postcard although it could still be mailed as such. The reference numerals appearing in FIG. 4 indicate that the structure of this second embodiment is the same as that of the first embodiment, with the exception that the longitudinal extent of section 24 is truncated as shown.

A third embodiment is shown in FIGS. 5-8. As perhaps best understood in connection with FIG. 5, the addition of top panel or section 50 to interconnect lens-carrying section 20a and scene-carrying section 24 aids the individual using the device in the proper positioning of the device because most people will understand that the various contiguous sections are to be positioned at ninety degree angles to one another. Ideally, the configuration of FIG. 5 should be maintained even when the upper image B is being viewed, but if the device user distorts the box as depicted in FIG. 6 in order to view the upper image A, the image will still be seen in three dimensions.

Septum means 52 is folded between the first and second sections 20a and 22 when the device is knocked down flat as shown in FIGS. 7 and 8. It is cut from the first and second sections 20a and 22, about mid width thereof, as at 53 (FIG. 7), and has a width less than the distance between lens members 30, 32 so as not to interfere therewith.

In this embodiment, first and third sections 20a and 24 have a common extended height so that two vertically spaced three dimensional images A and B are mountable on third section 24. Lens members 30, 32 are positioned in the first section 20a near the first folding line 14.

A fourth embodiment of the invention is depicted in FIGS. 9-14; the perspective view of FIG. 14 perhaps best depicts how this box-like embodiment is made. A flap 60 is cut out of top wall 50 along cutting lines 62, 64, 66, and 68, and a longitudinally extending fold line 70 is formed in said top wall 50. The flap is then folded downwardly into a vertical plane as indicated by arrow 72. Flap 60 serves as a septum means, preventing the viewer from viewing one of the scenes of the images A or B with two eyes simultaneously and thereby substantially insuring that the three dimensional image will be produced.

A tab 74, best shown in FIGS. 9 and 10, extends from the recessed bottom edge 76 of flap 60, and snaps into a complementally formed slot 78 (FIG. 12) that is formed in the second section 22 about midway between scene-carrying section 24 and lens-carrying section 20, said slot serving as a holding means for maintaining the flap 60 in its deployed configuration. The recessed edge of the fourth section enables the tab 7 to project therefrom without extending beyond the longitudinal edge of section 22. FIGS. 11 and 14 best depict how the snap fit engagement of tab 74 and slot 78 serve to hold septum wall or flap 60 in its operative position. The septum wall 60 also advantageously serves to hold the box-like structure in its correct configuration for viewing as is clear from said FIGS. 11 and 14.

Flap 60 may also be folded upwardly as depicted in FIG. 15. In this embodiment, a pair of tabs 80, 82 are received by complementally formed slots 84, 86, respectively. Cut-away 88 accommodates the nose of the individual using the viewer. The tabs 80, 82 project laterally from the device when it is knocked down flat, as shown in FIG. 16. Flap 60 is folded upwardly along longitudinally extending fold line 23 formed in intermediate section 22, as indicated by directional arrow 25 in FIG. 15.

Flap 60 may also be provided as an entirely separate piece, as depicted in FIGS. 17 and 18, the former of which shows flap 60 as an independent, i.e., separately formed part. Tabs 80 and 82 are placed into slots 84 and 86, respectively, when the device is unfolded and placed into its box-like operative configuration. Tab 88 is received in a slot 90 (FIG. 19) that is formed in middle section 22 coincident with the longitudinal axis of symmetry of said middle section 22.

Flap 60 may also be joined to the viewer along perforation lines 92 as depicted in FIG. 20. Once separated, the flap in FIG. 20 is identical to the flap in FIG. 17.

In all of the embodiments of FIGS. 10–20, the flap 60 extends from lens-carrying first section 20 to scene-carrying third panel 24. It serves two major purposes: It locks the viewer into the depicted parallelepiped form, thereby insuring that the viewer is properly unfolded and configured into its operative box-like configuration, and, perhaps even more importantly, it insures that the scenes will be seen in 3-D form because said flap constitutes an elongate septum means that prevents the individual's line of vision from crossing over from one side of the viewer to the other. Thus, an eye positioned at the left lens 32 cannot possibly see the right-hand scene and vice versa, it being understood that flap 60 is opaque.

A septum means that extends the entire length of the viewer was heretofore unknown in the art of stereoscopes. It follows that whether said septum means is folded upwardly from second section 22 or downwardly from fourth section 50 or is provided as a separate part is immaterial, it being understood that any septum means/flap that extends from a lens-carrying section to a scene-carrying section is within the scope of the claims that follow.

This invention is clearly new and useful. Moreover, it was not obvious to those of ordinary skill in this art at the time it was made, in view of the prior art, considered as a whole in accordance with the requirements of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A stereoscopic viewer, comprising:
   a flat, rectangular sheet material means of predetermined length, width, and thickness, said length being greater than said width;
   said sheet material means having only two transversely disposed, parallel fold lines formed therein, said fold lines being a first fold line and a second fold line and said first and second fold lines being formed transverse to a longitudinal axis of symmetry of said sheet material means;
   said first and second fold lines dividing said sheet material means into a first, second and third section only, said first and second sections being contiguous to one another and separated by said first fold line and said second and third sections being contiguous to one another and separated by said second fold line;
   a pair of scenes that produce a single image with a 3-D effect, when viewed through a 3-D lens, being positioned on said third section of said sheet material means;
   a pair of laterally spaced aperture means formed in said first section;
   a pair of 3-D lens means having a predetermined power being positioned in said aperture means;
   said second section having a length substantially equal to the focal length of said lens means;
   said first, second and third sections having a common width and thickness;
   a fourth section having the same length, width and thickness as said second section, said fourth section being disposed in interconnecting relation to free ends of said first and third sections;
   a third and a fourth fold line being formed opposite ends of said fourth section meet said first and third sections, respectively;
   a foldable flap member being at least in part cut out from said fourth section;
   a longitudinally-extending fold line formed in said fourth section, substantially mid-width thereof so that said flap member is foldable thereabout; and
   holding means holding said flap member in its folded position when said flap member is folded into substantially orthogonal relation to said second and fourth sections.

2. The stereoscopic viewer of claim 1, wherein said holding means includes a tab member that projects from a recessed edge of said fourth section and a complementally formed and cooperatively positioned slot that is formed in said second section.

* * * * *

UNITED STATES PATENT AND TRADEMARK OFFICE
CERTIFICATE OF CORRECTION

PATENT NO. : 5,058,991
DATED : 10/22/91
INVENTOR(S) : James J. Curtin

It is certified that error appears in the above-identified patent and that said Letters Patent is hereby corrected as shown below:

Column 6, line 51 states:

a third and a fourth fold line being formed opposite should state:

a third and a fourth fold line being formed where opposite

Signed and Sealed this

Second Day of February, 1993

Attest:

STEPHEN G. KUNIN

Attesting Officer

Acting Commissioner of Patents and Trademarks